(12) United States Patent
Sakai et al.

(10) Patent No.: US 10,870,770 B2
(45) Date of Patent: Dec. 22, 2020

(54) AQUEOUS INK, INK CARTRIDGE AND INK JET RECORDING METHOD

(71) Applicant: CANON KABUSHIKI KAISHA, Tokyo (JP)

(72) Inventors: Junichi Sakai, Machida (JP); Tsuyoshi Kanke, Yokohama (JP); Akiko Tominaga, Kawasaki (JP); Mamiko Kaji, Kawasaki (JP); Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 16/027,501

(22) Filed: Jul. 5, 2018

(65) Prior Publication Data
US 2019/0010345 A1 Jan. 10, 2019

(30) Foreign Application Priority Data

Jul. 7, 2017 (JP) .................................. 2017-133623
May 23, 2018 (JP) .................................. 2018-098723

(51) Int. Cl.
*C09D 11/322* (2014.01)
*C08K 5/053* (2006.01)
(Continued)

(52) U.S. Cl.
CPC ........... *C09D 11/322* (2013.01); *B41J 2/2107* (2013.01); *C08K 5/053* (2013.01); *C09D 11/38* (2013.01); *C09D 11/324* (2013.01)

(58) Field of Classification Search
CPC ................................................ C09D 11/30–40
See application file for complete search history.

(56) References Cited

U.S. PATENT DOCUMENTS 4,431,450 A * 2/1984 Hasegawa .............. B41M 5/128
106/31.73
5,180,425 A * 1/1993 Matrick ................. C09D 11/30
106/31.58
(Continued)

FOREIGN PATENT DOCUMENTS

EP 0 879 858 A2 11/1998
EP 2 230 281 A1 9/2010
(Continued)

OTHER PUBLICATIONS

English translation of JP 2009/179723, Aug. 2009; 18 pages.*
(Continued)

*Primary Examiner* — Helene Klemanski
(74) *Attorney, Agent, or Firm* — Venable LLP

(57) ABSTRACT

An aqueous ink that enables recording of an image with suppressed feathering and has high ejection stability can be provided. An aqueous ink for ink jet contains a pigment, a polyhydric alcohol derivative and a water-soluble organic solvent. The polyhydric alcohol derivative is a compound in which a proportion of $\{Y/(X+Y)\} \times 100$ (%) where X mole(s) of ethylene oxide group(s) and Y mole(s) of propylene oxide group(s) are added to polyhydric alcohol having three or more hydroxy groups is 55% or more to 95% or less. The water-soluble organic solvent includes a first water-soluble organic solvent having a relative dielectric constant of 10.0 or more to 40.0 or less.

14 Claims, 2 Drawing Sheets

(51) Int. Cl.
*B41J 2/21* (2006.01)
*C09D 11/38* (2014.01)
*C09D 11/324* (2014.01)

(56) References Cited

U.S. PATENT DOCUMENTS

| | | | |
|---|---|---|---|
| 5,302,197 A | 4/1994 | Wickramanayke et al. | |
| 5,356,464 A * | 10/1994 | Hickman | C09D 11/30 106/31.36 |
| 6,280,513 B1 | 8/2001 | Osumi et al. | |
| 6,332,919 B2 | 12/2001 | Osumi et al. | |
| 6,538,049 B1 * | 3/2003 | Kappele | C09D 11/322 523/161 |
| 6,676,736 B2 * | 1/2004 | Nakano | C09D 11/30 106/31.58 |
| 6,846,352 B2 * | 1/2005 | Yatake | C09D 11/40 106/31.58 |
| 7,297,194 B2 * | 11/2007 | Shinjo | C09D 11/38 106/31.27 |
| 7,888,406 B2 * | 2/2011 | Yatake | C09D 11/30 523/160 |
| 7,947,762 B2 | 5/2011 | Udagawa et al. | |
| 8,217,097 B2 | 7/2012 | Udagawa et al. | |
| 8,324,293 B2 | 12/2012 | Imai et al. | |
| 8,362,108 B2 | 1/2013 | Imai | |
| 8,367,750 B2 | 2/2013 | Moribe et al. | |
| 8,741,984 B2 | 6/2014 | Moribe et al. | |
| 8,936,357 B2 * | 1/2015 | Kosydar | C09D 11/322 347/100 |
| 9,981,480 B2 * | 5/2018 | Imai | C09D 11/40 |
| 2006/0160924 A1 | 7/2006 | Kakuchi et al. | |
| 2007/0097156 A1 | 5/2007 | Udagawa et al. | |
| 2010/0239759 A1 * | 9/2010 | Tojo | C09D 11/322 427/256 |
| 2012/0236068 A1 * | 9/2012 | Matsushita | C09D 11/54 347/20 |
| 2013/0085206 A1 * | 4/2013 | Zimmer | C09D 11/322 523/122 |
| 2014/0307023 A1 | 10/2014 | Moribe et al. | |
| 2016/0200925 A1 * | 7/2016 | Kaji | C09D 11/322 347/20 |
| 2016/0200929 A1 * | 7/2016 | Imai | C08K 5/053 347/21 |
| 2019/0009544 A1 * | 1/2019 | Nakagawa | B41J 2/14016 |
| 2019/0009545 A1 * | 1/2019 | Saito | B41J 2/18 |
| 2019/0126633 A1 * | 5/2019 | Imai | C09D 133/08 |

FOREIGN PATENT DOCUMENTS

| | | |
|---|---|---|
| JP | H06-25583 A | 2/1994 |
| JP | 2000-198955 A | 7/2000 |
| JP | 2002-167533 A | 6/2002 |
| JP | 2009-179723 A | 8/2009 |
| JP | 2011-074255 A | 4/2011 |
| JP | 2016-130014 A | 7/2016 |

OTHER PUBLICATIONS

English translation of JP 2002/167533, Jun. 2002; 26 pages.*
English translation of JP 2011/074255, Apr. 2011; 45 pages.*
English translation of JPH 06/25583, Feb. 1994; 13 pages.*
Oct. 22, 2018 extended European Search Report in European Patent Appln. No. 18182129.9.

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

Ink for use in an ink jet recording method has been required of further enhancing quality of recorded images in recent years. To meet this requirement, various additives have been studied. For example, an ink including a salt of monovalent cation is proposed (see Japanese Patent Application Laid-Open No. 2000-198955). Inks including polyhydric alcohol derivatives are also proposed (see Japanese Patent Application Laid-Open No. 2011-074255, Japanese Patent Application Laid-Open No. 2002-167533, Japanese Patent Application Laid-Open No. 2009-179723 and Japanese Patent Application Laid-Open No. 2016-130014).

SUMMARY OF THE INVENTION

Regarding image quality, suppression of feathering is a significant task in obtaining a sharp image. Unlike bleeding, which is spreading caused by mixing of a plurality of inks, feathering a phenomenon in which an ink spreads along fibers constituting a recording medium. When feathering occurs, the rim of an image seems as if fluffing had occurred, and a solution thereof is strongly demanded. Inventors of the present invention studied the inks proposed in Japanese Patent Application Laid-Open No. 2000-198955, Japanese Patent Application Laid-Open No. 2011-074255, Japanese Patent Application Laid-Open No. 2002-167533, Japanese Patent Application Laid-Open No. 2009-179723 and Japanese Patent Application Laid-Open No. 2016-130014, to find that none of the inks cannot achieve high levels of both suppression of feathering of a recorded image and enhancement of ejection stability.

It is therefore an object of the present invention to provide an aqueous ink that enables recording of an image with suppressed feathering and has high ejection stability. It is another object of the present invention to provide an ink cartridge and an ink jet recording method using this aqueous ink.

Specifically, the present invention provides an aqueous ink for ink jet including a pigment, a polyhydric alcohol derivative and a water-soluble organic solvent, the polyhydric alcohol derivative is a compound in which a proportion of $\{Y/(X+Y)\} \times 100(\%)$ where X mole(s) of ethylene oxide group(s) and Y mole(s) of propylene oxide group(s) are added to a polyhydric alcohol having three or more hydroxy groups is 55% or more to 95% or less, and the water-soluble organic solvent includes a first water-soluble organic solvent having a relative dielectric constant of 10.0 or more to 40.0 or less.

The present invention can provide an aqueous ink that enables recording of an image with suppressed feathering and has high ejection stability. The present invention can also provide an ink cartridge and an ink jet recording method using the aqueous ink.

Further features of the present invention will become apparent from the following description of exemplary embodiments with reference to the attached drawings.

BRIEF DESCRIPTION OF THE DRAWINGS

FIG. 2A is a perspective view of a main portion of the ink jet recording apparatus and FIG. 2B is a perspective view of a head cartridge.

DESCRIPTION OF THE EMBODIMENTS

Figure 1:
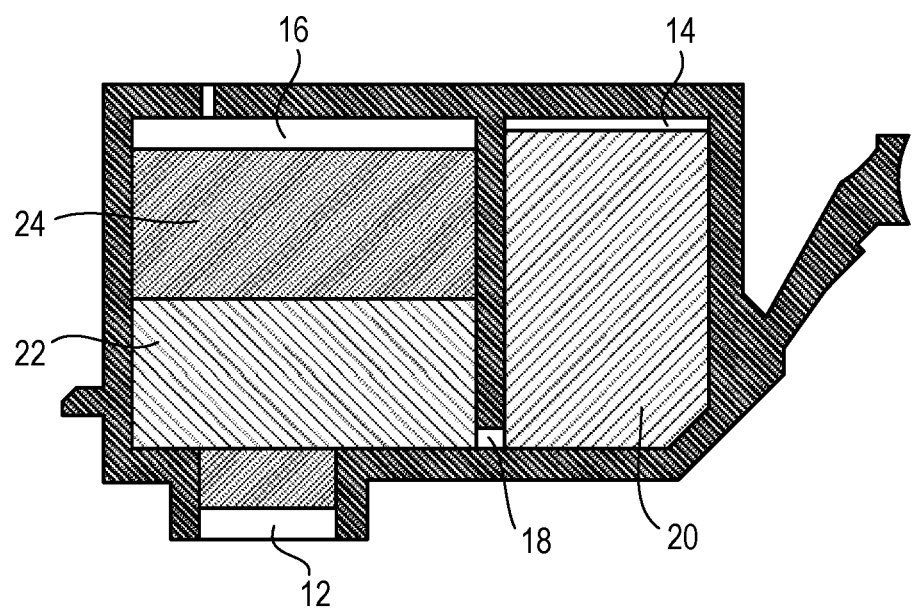
FIG. 1 is a cross-sectional view schematically illustrating an embodiment of an ink cartridge according to the present invention.

Preferred embodiments of the present invention will now be described in detail in accordance with the accompanying drawings. In the present invention, in a case where a compound is a salt, although the salt is dissociated from ions in an ink, the expression "including the salt" is employed for convenience of description. An aqueous ink for ink jet will be sometimes referred to simply as an "ink." Physical properties are values at room temperature (25° C.) unless otherwise specified.

The inventors of the present invention studied an ink that enables recording of an image with suppressed feathering and has high ejection stability. To suppress feathering, it is effective to quickly increase viscosity of an ink applied to a recording medium. An ethylene oxide group of a polyhydric alcohol derivative forms hydrogen bond with a pigment dispersed in the ink and a hydrophilic group such as an anionic group of a resin dispersant of the pigment to form a cross-linked structure. As moisture evaporates from the ink applied to the recording medium, the distance between the polyhydric alcohol derivative and a pigment particle decreases, and thus, viscosity of the ink rapidly increases. In the case that the number of branched structures of the polyhydric alcohol derivative increases, the density of the obtained cross-linked structure increases. Thus, polyhydric alcohol constituting the polyhydric alcohol derivative needs to be constituted by three or more hydroxy groups.

A factor controlling the strength of the cross-linked structure can be hydrophilic-hydrophobic properties by a repeating unit (R) of alkylene oxide groups in the polyhydric alcohol derivative. The hydrophobic property of the polyhydric alcohol derivative is increased by a propylene oxide group so that a cross-linked structure formed by using interaction between hydrophobic groups can be formed in addition to the cross-linked structure formed by hydrogen bond. That is, the use of the polyhydric alcohol derivative having a hydrophobic part can cause effective interaction between a hydrophobic part of the pigment particle and a hydrophobic part of the polyhydric alcohol derivative.

Hydrophobic property of the polyhydric alcohol derivative can be enhanced by a technique in which alkylene oxide groups are constituted only by propylene oxide groups, a technique of providing a highly hydrophobic structure such as a butylene oxide group or other techniques, as proposed in Japanese Patent Application Laid-Open No. 2011-074255, Japanese Patent Application Laid-Open No. 2002-167533, Japanese Patent Application Laid-Open No. 2009-179723 and Japanese Patent Application Laid-Open No. 2016-130014. In these techniques, however, not only in an ink which is applied to a recording medium and from which moisture starts evaporating but also in an ink in which evaporation of moisture has not started, the hydrophobic part of the polyhydric alcohol derivative strongly interacts with the hydrophobic part of the pigment particle. Thus, ejection stability of the ink is unstable. As proposed in Japanese Patent Application Laid-Open No. 2002-167533, in the case where alkylene oxide groups are constituted only by ethylene oxide groups, the cross-linked structure formed by using interaction between hydrophobic groups cannot be formed, and thus, it is difficult to suppress feathering.

To record an image with suppressed feathering while enhancing ejection stability of an ink, it is necessary to form the repeating unit of alkylene oxide groups by an ethylene oxide group and a propylene oxide group. In addition, it is also necessary to set the mole fraction of the propylene oxide group in the repeating unit of the alkylene oxide groups at 55% or more to 95% or less. If the mole fraction of the propylene oxide group is less than 55%, a hydrophilic property increases excessively, and it is therefore difficult to form a cross-linked structure by using interaction between hydrophobic groups. Accordingly, the viscosity of the ink does not increase easily, and consequently, it is difficult to suppress feathering. On the other hand, if the mole fraction of the propylene oxide group is more than 95%, the hydrophobic property increases excessively. Accordingly, interaction with the pigment particle or interaction between polyhydric alcohol derivatives increases, and thus, ejection stability of the ink is insufficient.

The use of the polyhydric alcohol derivative in which the ratio between the ethylene oxide group and the propylene oxide group is controlled can suppress feathering. When the ink is continuously ejected, however, ejection stability gradually decreases, and a recorded image tends to be disturbed. Since energy is applied to an ink that is being ejected, the ink tends to be in a state in which the pigment particles are locally cross-linked through the polyhydric alcohol derivative, and ink ejection stability is expected to decrease gradually. Through the study, the inventors of the present invention found that the use of a water-soluble organic solvent including a first water-soluble organic solvent whose relative dielectric constant is within a predetermined range can suppress local formation of cross-linking between the pigment particles through a polyhydric alcohol derivative so that ink ejection stability can thereby be enhanced. Although the first water-soluble organic solvent has the function of suppressing cross-linking in an ink, after the ink is applied to a recording medium, the ink permeates the recording medium together with a liquid component such as water. Thus, the first water-soluble organic solvent does not impair formation of a cross-linked structure by the polyhydric alcohol derivative and interaction between hydrophobic parts.

The first water-soluble organic solvent whose relative dielectric constant is within the predetermined range is oriented to the propylene oxide group of the polyhydric alcohol derivative, and interaction between the propylene oxide groups is weakened. Accordingly, it is expected that local cross-linking between the pigment particles through the polyhydric alcohol derivative can be suppressed and a dispersion state is stabilized so that ink ejection stability can be thereby enhanced. In general, as the relative dielectric constant increases, a hydrophilic property of a water-soluble organic solvent tends to increase. A first water-soluble organic solvent included in a water-soluble organic solvent for use in an ink according to the present invention has a relative dielectric constant of 10.0 or more to 40.0 or less. If the relative dielectric constant is more than 40.0, it is expected that the first water-soluble organic solvent is less likely to be oriented to the propylene oxide group and ejection stability of the ink is not significantly enhanced. On the other hand, as the relative dielectric constant decreases, the effect of contribution to dispersion of the pigment (polarization in the case of nonionic groups and a repulsive force by charges in the case of ionic groups) tends to decrease. Thus, if the relative dielectric constant is less than 10.0, in addition to the tendency of a low hydrophilic property, the dispersion state of the pigment easily becomes unstable, and thus, ejection stability of the ink is expected to decrease.

<Aqueous Ink>

An ink according to the present invention is an aqueous ink for ink jet including a pigment, a polyhydric alcohol derivative and a water-soluble organic solvent. Properties of the ink according to the present invention and components constituting the ink will be described hereinafter in detail.

(Pigment)

The ink according to the present invention includes a pigment as a coloring material. The content of the pigment contained in the ink is preferably 0.5% by mass or more to 15.0% by mass or less and more preferably 1.0% by mass or more to 10.0% by mass or less, with respect to the total mass of the ink.

Specific examples of the pigment include: inorganic pigments such as carbon black and titanium oxide; and organic pigments such as azo, phthalocyanine, quinacridone, isoindolinone, imidazolone, diketo-pyrrolo-pyrrole and dioxazine.

Examples of the dispersion method of the pigment include a resin-dispersed pigment using a resin as a dispersant and a self-dispersible pigment in which hydrophilic groups are bonded to the particle surface of the pigment. Examples of the dispersion method of the pigment also include a resin-bonded pigment in which organic groups including a resin are chemically bonded to the particle surface of the pigment and a microcapsule pigment in which the particle surface of the pigment is covered with a resin or another material. Among these pigments, the resin-dispersed pigment is preferably used. It should be noted that from the viewpoint of the degree of freedom in selecting a pigment, the resin-dispersed pigment in which a resin as a dispersant is physically adsorbed to the particle surface of the pigment is more preferable than the resin-bonded pigment in which a resin as a dispersant is chemically bonded to the particle surface of the pigment.

As a resin dispersant for dispersing the pigment in an aqueous medium, a dispersant that can disperse the pigment in the aqueous medium by an action of anionic groups is preferably used. As the resin dispersant, a resin described later is preferably used, and a water-soluble resin is more preferably used. The content (% by mass) of the pigment in the ink is preferably 0.3 times or more to 10.0 times or less as large as the content (% by mass) of the resin dispersant, in terms of a mass ratio.

As the self-dispersible pigment, an anionic group such as a carboxylic acid group, a sulfonic group or a phosphonic acid group has been bonded to the particle surface of the pigment directly or via another atomic group (—R—) can be used. The anionic group may be either an acid form or a salt form. In the case of a salt form, either a portion or entirety of the anionic group may be dissociated. In the case where the anionic group is a salt form, examples of the cations to be counter ions include alkali metal cations, ammonium and organic ammonium. Specific examples of another atomic group (—R—) include: a linear or branched alkylene group having 1 to 12 carbon atoms; an arylene group such as a phenylene group and a naphthylene group; a carbonyl group; an imino group; an amide group; a sulfonyl group; an ester group; and an ether group. The examples may also include a group using at least two or more of the above-listed groups in combination.

(Polyhydric Alcohol Derivative)

The polyhydric alcohol derivative for use in the ink according to the present invention is a compound in which an ethylene oxide group of X mole(s) and a propylene oxide group of Y mole(s) are added to polyhydric alcohol having three or more hydroxy groups. The polyhydric alcohol derivative is a compound in which a proportion of {Y/(X+Y)}×100(%) is 55% or more to 95% or less.

The polyhydric alcohol derivative is an alkylene oxide denatured polyhydric alcohol compound having a structure in which an ethylene oxide group and a propylene oxide group are added to a portion except hydrogen atoms of hydroxy groups of polyhydric alcohol having three or more hydroxy groups. The polyhydric alcohol derivative has a structure expressed by general formula (1):

(1)

In general formula (1), L is an alcohol residue except for hydroxy groups. In general formula (1), R represents an ethylene oxide group or a propylene oxide group independently of each other, n is an integer of three or more and represents the number of alkylene oxide groups. The value of the sum of n in one molecule of the polyhydric alcohol derivative is equal to the value of X+Y, and m is an integer of three or more and equal to the number of hydroxy groups of polyhydric alcohol. In general formula (1), the ethylene oxide group and the propylene oxide group represented by R may be a block structure or a random structure. The mole numbers and the proportions of the ethylene oxide group and the propylene oxide group represented by R are calculated on the assumption that the mole numbers and the proportions are added in average to a plurality of Rs as average values of the mole numbers of the ethylene oxide group(s) and the propylene oxide group(s) added to the whole of one molecule of the polyhydric alcohol derivative.

An ethylene oxide group is expressed as —$CH_2CH_2O$—. The propylene oxide group is expressed as —$CH_2CH(CH_3)$O—. The proportion of {Y/(X+Y)}×100(%) expressed by using the mole number X of the ethylene oxide group(s) and the mole number Y of the propylene oxide group(s) in one molecule of the polyhydric alcohol derivative is 55% or more to 95% or less, and is preferably 70% or more to 90% or less.

Polyhydric alcohol as a main skeleton of the polyhydric alcohol derivative has three or more hydroxy groups. The polyhydric alcohol preferably has ten or less hydroxy groups, and more preferably has three or more to six or less hydroxy groups. If the polyhydric alcohol has less than three hydroxy groups, formation of a cross-linked structure by using interaction between hydrophobic groups is insufficient so that feathering cannot be suppressed. The polyhydric alcohol preferably has ten or less, and more preferably six or less, hydroxy groups. Then, ink ejection stability can be further enhanced. Among these examples, the polyhydric alcohol preferably has six hydroxy groups.

Examples of the polyhydric alcohol include sorbitol, maltitol, xylitol, erythritol, lactitol, mannitol, glycerin, polyglycerin, oligosaccharide alcohol, palatinit, threitol, arabinitol, ribitol, iditol, volemitol, perseitol, octitol, galactitol, trimethylolpropane, trimethylolethane and condensates of any of these polyhydric alcohols. Among these polyhydric alcohols, sorbitol is especially preferable. The use of the polyhydric alcohol derivative using sorbitol as a main skeleton can enhance suppression of feathering and ink ejection stability especially in a well-balanced manner.

The content (% by mass) of the polyhydric alcohol derivative in the ink is preferably 0.5% by mass or more to 4.0% by mass or less with respect to the total mass of the ink. If the content of the polyhydric alcohol derivative is less than 0.5% by mass, a cross-linking effect by the polyhydric alcohol derivative becomes slightly weak so that the effect of suppressing feathering slightly decreases in some cases. On the other hand, if the content of the polyhydric alcohol derivative is more than 4.0% by mass, the viscosity of the ink increases so that ejection stability slightly decreases in some cases.

The molecular weight of the polyhydric alcohol derivative is 1,500 or more to 25,000 or less. If the molecular weight of the polyhydric alcohol derivative is less than 1,500, a cross-linking effect by the polyhydric alcohol derivative is slightly weakened so that the effect of suppressing feathering slightly decreases in some cases. On the other hand, if the molecular weight of the polyhydric alcohol derivative is more than 25,000, the viscosity of the ink increases so that ejection stability slightly decreases in some cases. Among these ranges, the molecular weight of the polyhydric alcohol derivative is more preferably 2,000 or more to 15,000 or less, and much more preferably 3,000 or more to 10,000 or less. The mole numbers of the ethylene oxide group and the propylene oxide group in the polyhydric alcohol derivative can have distributions in some cases. In these cases, the molecular weight can be calculated by using an average value of the mole numbers.

(First Water-Soluble Organic Solvent)

The ink according to the present invention includes a water-soluble organic solvent. The water-soluble organic solvent includes a first water-soluble organic solvent whose relative dielectric constant at 25° C. is 10.0 or more to 40.0 or less.

The relative dielectric constant of the water-soluble organic solvent can be measured under a condition of a frequency of 10 kHz with a dielectric constant meter (e.g., product name "BI-870" (manufactured by BROOKHAVEN INSTRUMENTS CORPORATION)). A relative dielectric constant of the water-soluble organic solvent that is solid at 25° C. is assumed to be a value calculated from Equation (A) below by measuring a relative dielectric constant of a 50% by mass of aqueous solution. The "water-soluble organic solvent" generally refers to liquid, but in the present invention, includes a water-soluble organic solvent that is solid at 25° C. (room temperature), $$\varepsilon_{sol} = 2\varepsilon_{50\%} - \varepsilon_{water} \quad (A)$$

where $\varepsilon_{sol}$ is a relative dielectric constant of the water-soluble organic solvent that is solid at 25° C., $\varepsilon_{50\%}$ is a relative dielectric constant of the 50% by mass of aqueous solution of the water-soluble organic solvent that is solid at 25° C. and $\varepsilon_{water}$ is a relative dielectric constant of water.

Specific examples of the water-soluble organic solvent that is solid at 25° C. generally used for an aqueous ink include 1,6-hexanediol, trimethylolpropane, ethyleneurea, urea and polyethylene glycol having a number-average molecular weight of 1,000.

A reason for calculating the relative dielectric constant of the water-soluble organic solvent that is solid at 25° C. from the relative dielectric constant of the 50% by mass of aqueous solution is as follows. Some of water-soluble organic solvents that are solid at 25° C. and can be constituents for an aqueous ink have difficulty in preparing an aqueous solution of a concentration more than 50% by mass. On the other hand, in aqueous solutions of concentrations of 10% by mass or less, the relative dielectric constant of water is dominant, and it is difficult to obtain a true (effective) relative dielectric constant of a water-soluble organic solvent. In view of this, the inventors of the present invention conducted a study to find that most of water-soluble organic solvents that are used for an ink and are solid at 25° C. enable preparation of an aqueous solution as a measurement target, and can be used for calculating a relative dielectric constant conforming to advantages of the present invention. For the foregoing reasons, the present invention uses the relative dielectric constant of the water-soluble organic solvent that is solid at 25° C. calculated from the relative dielectric constant of the 50% by mass of aqueous solution. Regarding water-soluble organic solvents that are solid at 25° C. and have low solubility in water to be incapable of preparing the 50% by mass of aqueous solution, an aqueous solution of a saturated concentration is used, and a relative dielectric constant calculated according to the case of calculating the $\varepsilon_{sol}$ described above is used for convenience.

Specific examples of the first water-soluble organic solvent include 1-(2-hydroxyethyl)-2-pyrrolidone (37.6), trimethylolpropane (33.7), methanol (33.1), N-methyl-2-pyrrolidone (32.0), triethanolamine (31.9), diethylene glycol (31.7), 1,4-butanediol (31.1), 1,3-butanediol (30.0), 3-methylsulfolane (29.0), 1,2-propanediol (28.8), 1,2,6-hexanetriol (28.5), 2-methyl-1,3-propanediol (28.3), 2-pyrrolidone (28.0), 1,5-pentanediol (27.0), 3-methyl-1,3-butanediol (24.0), 3-methyl-1,5-pentanediol (23.9), ethanol (23.8), 1-(hydroxymethyl)-5,5-dimethylhydantoin (23.7), triethylene glycol (22.7), tetraethylene glycol (20.8), polyethylene glycol having a number-average molecular weight of 200 (18.9), 2-ethyl-1,3-hexanediol (18.5), isopropanol (18.3), 1,2-hexanediol (14.8), n-propanol (12.0) and polyethylene glycol having a number-average molecular weight of 600 (11.4) (each of the numerical values in parentheses represents a relative dielectric constant at 25° C.).

A vapor pressure of the first water-soluble organic solvent at 25° C. is preferably lower than that of water. Since the viscosity tends to increase when water evaporates from the recording medium, the first water-soluble organic solvent is preferably a compound that is solid at 25° C. Examples of the first water-soluble organic solvent that is solid at 25° C. include trimethylolpropane and polyethylene glycol having a number-average molecular weight of 600.

The content (% by mass) of the first water-soluble organic solvent in the ink is preferably 0.5% by mass or more to 40.0% by mass or less with respect to the total mass of the ink. The content (% by mass) of the first water-soluble organic solvent is preferably 0.5 times or more to 10.0 times or less as large as the content (% by mass) of the polyhydric alcohol derivative in terms of a mass ratio. If the mass ratio is less than 0.5 times, a small amount of the first water-soluble organic solvent is oriented to the polyhydric alcohol derivative, and a cross-linking effect in the ink can be insufficiently suppressed in some cases, resulting in a possibility of a slight decrease in ejection stability. On the other hand, if the mass ratio is more than 10.0 times, the cross-linking effect by the polyhydric alcohol derivative is slightly weak, resulting in a possibility of a slight decrease in suppressing feathering.

(Aqueous Medium)

The ink according to the present invention is an aqueous ink including an aqueous medium that is a mixed solvent of water and a water-soluble organic solvent. As water, deionized water or ion-exchanged water is preferably used. The content (% by mass) of water in the ink is preferably 50.0% by mass or more to 95.0% by mass or less with respect to the total mass of the ink.

The water-soluble organic solvent includes a first water-soluble organic solvent whose relative dielectric constant at 25° C. is 10.0 or more to 40.0 or less. The water-soluble organic solvent may be any water-soluble solvent, and may be alcohol, polyhydric alcohol, polyglycol, glycol ether, a nitrogen-containing polar solvent or a sulfur-containing polar solvent, for example. The content (% by mass) of the water-soluble organic solvent (including the first water-soluble organic solvent) in the ink is preferably 3.0% by mass or more to 50.0% by mass or less with respect to the total mass of the ink.

Specific examples of the water-soluble organic solvent (including specific examples of the first water-soluble organic solvent) include: monohydric alcohols having 1 to 4 carbon atoms such as methylalcohol (33.1), ethylalcohol (23.8), n-propyl alcohol, isopropyl alcohol (18.3), n-butyl alcohol, sec-butyl alcohol and tert-butyl alcohol; dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), 3-methyl-1,3-butanediol (24.0), 3-methyl-1,5-pentanediol (23.9) and 2-ethyl-1,3-hexanediol (18.5); polyhydric alcohols such as 1,2,6-hexanetriol (28.5), glycerin (42.3), trimethylolpropane (33.7) and trimethylolethane; alkylene glycols such as ethylene glycol (40.4), diethylene glycol (31.7), triethylene glycol (22.7), tetraethylene glycol, butylene glycol, hexylene glycol and thiodiglycol; glycol ethers such as diethylene glycol monomethyl ether, diethylene glycol monethyl ether, triethylene glycol monoethyl ether and triethylene glycol monobutyl ether (9.8); polyalkylene glycols having a number-average molecular weight of 200 to 1,000 such as polyethylene glycol (18.9) having a number-average molecular weight of 200, polyethylene glycol (11.4) having a number-average molecular weight of 600, polyethylene glycol (4.6) having a number-average molecular weight of 1,000 and polypropylene glycol; nitrogen-containing compounds such as 2-pyrrolidone (28.0), N-methyl-2-pyrrolidone (32.0), 1-(2-hydroxyethyl)-2-pyrrolidone (37.6), 1,3-dimethyl-2-imidazolidinone, N-methylmorpholine, urea (110.3), ethyleneurea (49.7), triethanolamine (31.9), 1-hydroxymethyl-5,5-dimethylhydantoin (23.7) and 1,3-bis(2-hydroxyethyl)-5,5-dimethylhydantioin (16.0); sulfur-containing compounds such as dimethyl sulfoxide (48.9) and bis(2-hydroxyethyl sulfone); and cyclic ethers such as γ-butyrolactone (41.9) (each of the numerical values in parentheses represents a relative dielectric constant at 25° C.). The water-soluble organic solvent (except for the first water-soluble organic solvent) preferably has a relative dielectric constant of 3.0 or more. A water-soluble organic solvent to be included in the ink is preferably a water-soluble organic solvent whose vapor pressure at 25° C. is lower than that of water.

(Resin)

The ink may include a resin. The content (% by mass) of the resin in the ink is preferably 0.1% by mass or more to 20.0% by mass or less, and is more preferably 0.5% by mass or more to 15.0% by mass or less, with respect to the total mass of the ink.

The resin can be added to the ink in order to (i) stabilize a dispersion state of the pigment, that is, to be as the resin dispersant described above or an auxiliary of the resin dispersant. In addition, the resin can also be added to the ink in order to (ii) enhance various characteristics of an image to be recorded. Examples of the state of the resin include a block copolymer, a random copolymer, a graft copolymer and combinations using two or more of these copolymers. The resin may be a water-soluble resin that can be dissolved in an aqueous medium or a resin particle that can be dispersed in an aqueous medium. The resin particle does not need to contain a coloring material.

In this specification, the expression "the resin is water-soluble" means that in a case where this resin is neutralized by alkali in an amount corresponding to an acid value, the resin is present in an aqueous medium in a state where particles usable for measuring a particle size by a dynamic light scattering technique. It can be determined whether the resin is water-soluble or not in accordance in the following manner. First, a liquid (resin solid content: 10% by mass) including a resin neutralized by alkali in an amount corresponding to an acid value (e.g., sodium hydroxide or sodium hydroxide) is prepared. Next, the prepared liquid is diluted to 10 times (by volume) with prepared pure water, thereby preparing a sample solution. Then, in the case of measuring a particle size of the resin in the sample solution with a dynamic light scattering technique, if particles having a particle size are not observed, this resin is determined to be water-soluble. Measurement conditions in this case can be, for example, as follows:

[Measurement Condition]
SetZero: 30 seconds
The number of measurements: 3 times
Measurement time: 180 seconds A particle size distribution analyzer can be a particle size analyzer using a dynamic light scattering technique (e.g., product name "UPA-EX150", manufactured by Nikkiso Co., Ltd.). The particle size distribution analyzer and the measurement conditions used here are not, of course, limited to the examples described above.

The acid value of the water-soluble resin is preferably 100 mgKOH/g or more to 250 mgKOH/g or less. The resin constituting the resin particle preferably has an acid value of 5 mgKOH/g or more to 100 mgKOH/g or less. The water-soluble resin preferably has a weight-average molecular weight of 3,000 or more to 15,000 or less. The resin constituting the resin particle preferably has a weight-average molecular weight of 1,000 or more to 2,000,000 or less. The resin particle measured by a dynamic light scattering technique preferably has a volume-average particle size of 100 nm or more to 500 nm or less.

Examples of the resin include an acrylic resin, a urethane resin and an olefin resin. Among these resins, the acrylic resin and the urethane resin are preferable.

The acrylic resin preferably includes, as constituent units, a hydrophilic unit and a hydrophobic unit. Among these units, a resin including a hydrophilic unit derived from (meth)acrylic acid and a hydrophobic unit derived from at least one of a monomer having an aromatic ring and a (meth)acrylic acid ester monomer is preferable. In particular, a resin including a hydrophilic unit derived from (meth) acrylic acid and a hydrophobic unit derived from a monomer of at least one of styrene and α-methylstyrene. These resins easily interact with a pigment, and thus, can be suitably used as a dispersant for dispersing the pigment.

The hydrophilic unit is a unit having a hydrophilic group such as an anionic group. The hydrophilic unit can be formed by, for example, polymerizing hydrophilic monomers having hydrophilic groups. Specific examples of the hydrophilic monomers having hydrophilic groups include acid monomers having carboxylic acid groups such as (meth)acrylic acid, itaconic acid, maleic acid and fumaric acid and anionic monomers such as anhydrides and salts of these acid monomers. Examples of cations constituting a salt of the acid monomers include ions of lithium, sodium, potassium, ammonium and organic ammonium. The hydrophobic unit is a unit not having a hydrophilic group such as an anionic group. The hydrophobic unit can be formed by, for example, polymerizing hydrophobic monomers not having a hydrophilic group such as an anionic group. Specific examples of the hydrophobic monomers include: monomers having an aromatic ring such as styrene, α-methylstyrene and benzyl (meth)acrylate; and (meth)acrylate monomers such as methyl (meth)acrylate, butyl (meth)acrylate and 2-ethylhexyl (meth)acrylate.

The urethane resin can be obtained by, for example, causing polyisocyanate and polyol to react with each other. The urethane resin can also be obtained by further reaction of a chain extender. Examples of the olefin resin include polyethylene and polypropylene.

The ink according to the present invention preferably further includes a resin particle. When the ink including the resin particle is applied to the recording medium, viscosity of the ink rapidly increases with evaporation of water. Thus, in combination with interaction between the polyhydric alcohol derivative and the first water-soluble organic solvent, feathering can be more effectively suppressed. The resin particle is preferably an acrylic resin particle having an anionic group. The use of the resin particles having an anionic group can enhance dispersion stability by repulsion of charges. In addition, the use of the resin particle is also preferable because hydrogen bond with the polyhydric alcohol derivative enables formation of a cross-linked structure.

The resin particle preferably has an acid group. The introduction amount of the acid group of the resin particle is preferably 120 μmol/g or more to 250 μmol/g or less. If the introduction amount of the acid group is less than 120 μmol/g, the effect of enhancing dispersion stability due to repulsion of charges slightly decreases in some cases. In addition, since the dispersion stability of the resin particle decreases, ejection stability slightly decreases in some cases. Furthermore, since the amount of anionic groups is small, that is, hydrogen bond with the polyhydric alcohol derivative occurs in a small portion, the amount of the cross-linked structure to be formed is small so that the effect of suppressing feathering slightly decreases in some cases. On the other hand, if the introduction amount of the acid group is more than 250 μmol/g, the amount of counter ions of anionic groups increases. Accordingly, the amount of charges increases and, on the other hand, repulsion of charges decreases. Thus, the effect of enhancing dispersion stability by repulsion of charges slightly decreases in some cases. In addition, since dispersion stability of the resin particle decreases, ejection stability slightly decreases in some cases. Regarding the resin particle, the introduction amount of the acid group is small in general. Thus, to determine properties of the resin particle more precisely, the present invention employs not a general acid value (mgKOH/g) but the "introduction amount of acid group (μmol/g)."

(Other Components)

The ink according to the present invention may include various additives such as a surfactant, a pH adjuster, a rust preventive, an antiseptic, a mildewproofing agent, an antioxidant, an antireduction agent, an evaporation promoter and a chelating agent, as necessary.

(Ink Properties)

The ink according to the present invention is an aqueous ink for ink jet recording. Thus, properties of the ink are preferably appropriately controlled. Specifically, a surface tension of the ink at 25° C. is preferably 10 mN/m or more to 60 mN/m or less, and is more preferably 20 mN/m or more to 60 mN/m or less. The viscosity of the ink at 25° C. is preferably 1.0 mPa·s or more to 10.0 mPa·s or less, and is more preferably 1.0 mPa·s or more to 5.0 mPa·s or less. The pH of the ink at 25° C. is preferably 5.0 or more to 10.0 or less, and more preferably 7.0 or more to 9.5 or less.

<Ink Cartridge>

The ink cartridge according to the present invention includes an ink and an ink storage portion for storing the ink. The ink stored in the ink storage portion is the ink according to the present invention described above. FIG. 1 is a cross-sectional view schematically illustrating an embodiment of the ink cartridge according to the present invention. As illustrated in FIG. 1, the bottom surface of the ink cartridge has an ink supply port 12 for supplying the ink to a recording head. The inside of the ink cartridge is the ink storage portion for storing the ink. The ink storage portion is constituted by an ink storage chamber 14 and an absorber storage chamber 16 that communicate with each other through a communication port 18. The absorber storage chamber 16 communicates with the ink supply port 12. The ink storage chamber 14 stores a liquid ink 20. The absorber storage chamber 16 stores absorbers 22 and 24 that hold the ink in an immersed state. The ink storage portion may be in a state where the whole stored ink is held by absorbers without an ink storage chamber for storing a liquid ink. The ink storage portion may include no absorbers and store the ink that is entirely in a liquid state. In addition, the ink cartridge may be configured to include an ink storage portion and a recording head.

<Ink Jet Recording Method>

An ink jet recording method according to the present invention is a method for recording an image on a recording medium by ejecting the ink according to the present invention described above from an ink jet recording head. Examples of a method for ejecting the ink include a method of applying mechanical energy to the ink and a method of applying thermal energy to the ink. In the present invention, the method of ejecting the ink by applying thermal energy to the ink is especially preferable. Process steps of the ink jet recording method except for using the ink according to the present invention may be known process steps.

Figure 2A:
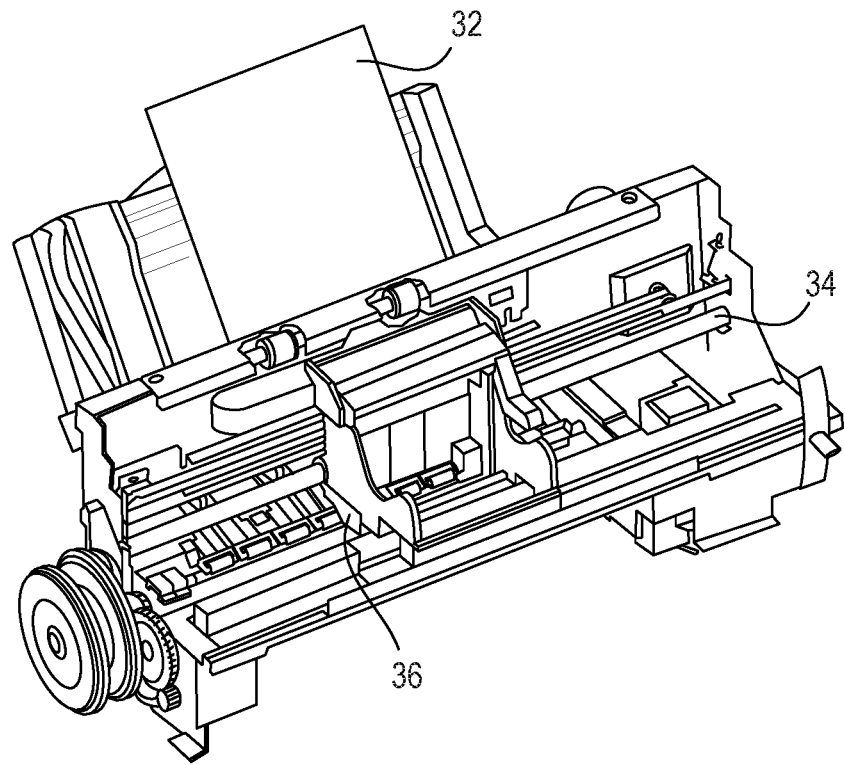
FIGS. 2A and 2B are perspective views schematically illustrating an example of an ink jet recording apparatus for use in an ink jet recording method according to the present invention.
Figure 2B:
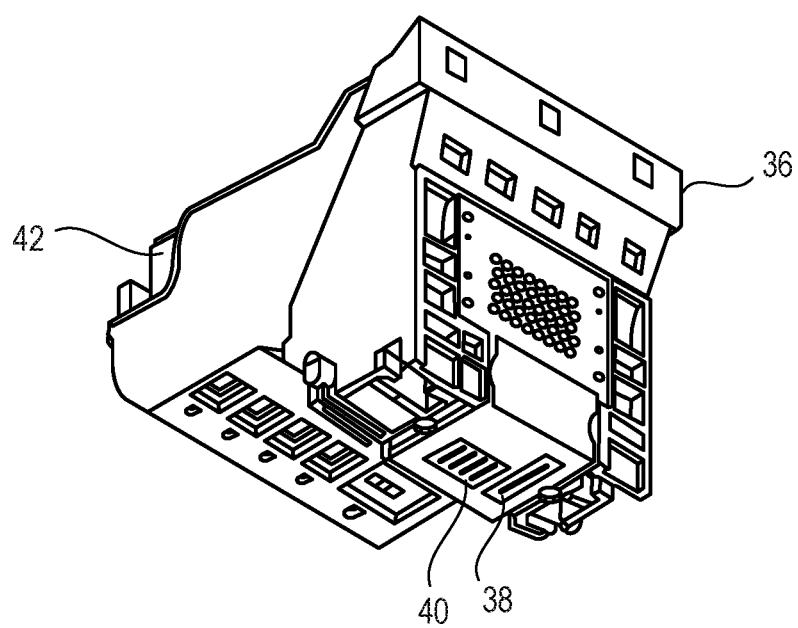

FIGS. 2A and 2B are perspective views schematically illustrating an example of an ink jet recording apparatus used for the ink jet recording method according to the present invention, FIG. 2A is a perspective view of a main portion of the ink jet recording apparatus, and FIG. 2B is a perspective view of a head cartridge. The ink jet recording apparatus includes a conveyance unit (not shown) for conveying a recording medium 32 and a carriage shaft 34. On the carriage shaft 34, a head cartridge 36 can be mounted. The head cartridge 36 includes recording heads 38 and 40 and is configured such that the ink cartridge 42 is placed on the head cartridge 36. While the head cartridge 36 is conveyed in a main scanning direction along the carriage shaft 34, the ink (not shown) is ejected from the recording heads 38 and 40 toward the recording medium 32. The recording medium 32 is then conveyed in a sub-scanning direction by the conveyance unit (not shown) so that an image is thereby recorded on the recording medium 32.

EXAMPLES

The present invention will be described in further detail with reference to examples and comparative examples, and the present invention is not limited to the following examples unless exceeding the gist thereof. Regarding constituent amounts, "part" and "%" are on a mass basis unless otherwise specified.

<Preparation of Pigment Dispersion Liquid>

(Pigment Dispersion Liquid 1)

A styrene-ethyl acrylate-acrylate acid copolymer (resin 1) having an acid value of 150 mgKOH/g and a weight-average molecular weight of 8,000 was prepared. Then, 20.0 parts of the resin 1 was neutralized by sodium hydroxide of a concentration corresponding to an acid value of the resin, and supplemented with an appropriate amount of pure water, thereby preparing an aqueous solution of the resin 1 in which the content of the resin (solid content) was 20.0%. Thereafter, 10.0 parts of a pigment (C.I. pigment yellow 74), 15.0 parts of an aqueous solution of the resin 1 and 75.0 parts of pure water were mixed together, thereby obtaining a mixture. The resulting mixture and 200 parts of zirconia beads with a diameter of 0.3 mm were placed in a batch-type vertical sand mill (manufactured by AIMEX Co., Ltd.), dispersed for five hours while being cooled by water and then subjected to centrifugal separation, thereby removing coarse particles. The resulting mixture was subjected to pressure filtration with a cellulose acetate filter (manufactured by Advantech Co., Ltd.) having a pore size of 3.0 μm, thereby preparing a pigment dispersion liquid 1 having a pigment content of 10.0% and a resin dispersant (resin 1) content of 3.0%.

(Pigment Dispersion Liquid 2)

Through a procedure similar to that for the pigment dispersion liquid 1 except for a change of the pigment to a C.I. pigment red 122, a pigment dispersion liquid 2 having a pigment content of 10.0% and a resin dispersant content of 3.0% was prepared.

(Pigment Dispersion Liquid 3)

Through a procedure similar to that for the pigment dispersion liquid 1 except for a change of the pigment to a C.I. pigment blue 15:3, a pigment dispersion liquid 3 having a pigment content of 10.0% and a resin dispersant content of 3.0% was prepared.

(Pigment Dispersion Liquid 4)

Through a procedure similar to that for the pigment dispersion liquid 1 except for a change of the pigment to carbon black, a pigment dispersion liquid 4 having a pigment content of 10.0% and a resin dispersant content of 3.0% was prepared.

(Pigment Dispersion Liquid 5)

First, 300 g of a pigment (carbon black) was placed in 1,000 mL of water and stirred, and then 450 g of a sodium hypochlorite aqueous solution (having an effective chlorine concentration of 12%) was dropped thereon, and the resulting mixture was stirred for 10 hours at 100° C. to 105° C. The mixture was purified by ultrafiltration, and then supplemented with an appropriate amount of ion-exchanged water so that the content of a pigment was adjusted, thereby preparing a pigment dispersion liquid 5 having a pigment content of 10.0%.

<Preparation of Polyhydric Alcohol Derivative>

Polyhydric alcohol derivatives (compounds 1 through 21) shown in Table 1 were prepared. Compounds 19 through 21 in Table 1 are described in detail as follows:

Compound 19: a compound corresponding to product name "New Pole GP-250" (manufactured by Sanyo Chemical Industries, Ltd.) used in an example in Japanese Patent Application Laid-Open No. 2011-074255

Compound 20: a compound corresponding to product name "LEOCON TP53E" (manufactured by Lion Corporation) used in an example in Japanese Patent Application Laid-Open No. 2002-167533

Compound 21: a compound corresponding to "compound a-1" used in an example in Japanese Patent Application Laid-Open No. 2009-179723 (a compound to which 34 moles of ethylene oxide groups and 14 moles of a butylene oxide groups were added and in which a terminal of an alkylene oxide group was a methyl group)

<Preparation of Resin Particle>
(Method for Measuring and Calculating Acid Group)

The introduction amount of the acid group of the resin particle was measured and calculated in the following manner. Hydrochloric acid was added to a dispersion liquid of the resin particle until the pH reached two or less, and a precipitate was taken through filtration. The obtained precipitate was washed with water and dried at 40° C. under a reduced pressure, thereby obtaining a dry substance. The obtained dry substance was used as a sample for measurement, and an acid value was measured in accordance with a method in conformity with JIS standards (JIS K 0070-1992).

TABLE 1

Properties of polyhydric alcohol derivative

| | Polyhydric alcohol derivative residue | | | | Sum of n $(X+Y)$ | Alkylene oxide group | | | |
|---|---|---|---|---|---|---|---|---|---|
| Compound | Structure | Type | Valence | m | | Ethylene oxide group X (mole) | Propylene oxide group Y (mole) | Value of $Y/(X+Y)$* 100 (%) | Molecular weight |
| 1 | (A) | sorbitol | 6 | 4 | 100 | 20 | 80 | 80 | 5,709 |
| 2 | (A) | sorbitol | 6 | 4 | 100 | 45 | 55 | 55 | 5,359 |
| 3 | (A) | sorbitol | 6 | 4 | 100 | 35 | 65 | 65 | 5,499 |
| 4 | (A) | sorbitol | 6 | 4 | 100 | 30 | 70 | 70 | 5,569 |
| 5 | (A) | sorbitol | 6 | 4 | 100 | 10 | 90 | 90 | 5,850 |
| 6 | (A) | sorbitol | 6 | 4 | 100 | 5 | 95 | 95 | 5,920 |
| 7 | (A) | sorbitol | 6 | 4 | 20 | 4 | 16 | 80 | 1,288 |
| 8 | (A) | sorbitol | 6 | 4 | 25 | 5 | 20 | 80 | 1,564 |
| 9 | (A) | sorbitol | 6 | 4 | 445 | 89 | 356 | 80 | 24,779 |
| 10 | (A) | sorbitol | 6 | 4 | 460 | 92 | 368 | 80 | 25,608 |
| 11 | (B) | glycerin | 3 | 1 | 100 | 20 | 80 | 80 | 5,615 |
| 12 | (C) | trimethylolpropane | 3 | 1 | 100 | 20 | 80 | 80 | 5,661 |
| 13 | (A) | xylitol | 4 | 2 | 100 | 20 | 80 | 80 | 5,649 |
| 14 | (B) | polyglycerin (octamer) | 10 | 8 | 100 | 20 | 80 | 80 | 6,134 |
| 15 | (D) | ethylene glycol | 2 | — | 100 | 20 | 80 | 80 | 5,589 |
| 16 | (A) | sorbitol | 6 | 4 | 100 | 100 | 0 | 0 | 4,587 |
| 17 | (A) | sorbitol | 6 | 4 | 100 | 50 | 50 | 50 | 5,289 |
| 18 | (A) | sorbitol | 6 | 4 | 100 | 0 | 100 | 100 | 5,990 |
| 19 | (B) | glycerin | 3 | 1 | 100 | 0 | 100 | 100 | 5,896 |
| 20 | (C) | trimethylolpropane | 3 | 1 | 100 | 100 | 0 | 0 | 4,539 |
| 21 | (B) | glycerin | 3 | 1 | 100 | 100 | 0 | 0 | 4,493 |

The "Structure" of the polyhydric alcohol derivatives in Table 1 is shown below.

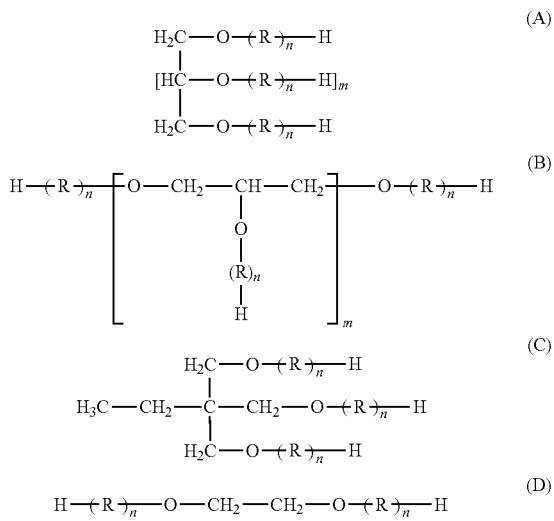

Then, the introduction amount of the acid group in the resin particle was calculated from the following formula:

Introduction amount of the acid group (µmol/g)=acid value (mgKOH/g)×1000/56.1

(Resin Particle 1)

First, 18.0 parts of butyl methacrylate, 0.35 parts of methacrylic acid, 2.0 parts of a polymerization initiator (2,2'-azobis(2-methylbutyronitrile)) and 2.0 parts of n-hexadecane were placed in a four-neck flask including an agitator, a reflux condenser and a nitrogen gas inlet tube. A nitrogen gas was introduced to a reaction system, and the reaction system was stirred for 0.5 hours. Thereafter, 78.0 parts of a 6.0% aqueous solution of an emulsifier (product name "NIKKOL BC15", manufactured by Nikko Chemicals Co., Ltd.) was dropped in the reaction system, and the reaction system was stirred for 0.5 hours, thereby obtaining a mixture. The mixture was irradiated with ultrasonic waves for three hours with a supersonic wave irradiator to be emulsified, and then was subjected to polymerization reaction for four hours at 80° C. in a nitrogen atmosphere. The reaction system was cooled to 25° C., then filtered, and supplemented with an appropriate amount of pure water, thereby preparing an aqueous dispersion of resin particle 1 having a solid content (resin particle) of 40.0%. The introduction amount of the acid group of the resin particle 1 was 180 µmol/g.

(Resin Particle 2)

An aqueous dispersion of resin particle 2 having a solid content (resin particle) of 40.0% was prepared with a procedure similar to that of the resin particle 1 except that the amount of use of methacrylic acid was changed to 0.22 parts. The amount of the acid group of the resin particle 2 was 100 µmol/g.

(Resin Particle 3)

An aqueous dispersion of resin particle 3 having a solid content (resin particle) of 40.0% was prepared with a procedure similar to that of the resin particle 1 except that the amount of use of methacrylic acid was changed to 0.27 parts. The amount of the acid group of the resin particle 3 was 120 µmol/g.

(Resin Particle 4)

An aqueous dispersion of resin particle 4 having a solid content (resin particle) of 40.0% was prepared with a procedure similar to that of the resin particle 1 except that the amount of use of methacrylic acid was changed to 0.54 parts. The amount of the acid group of the resin particle 4 was 250 µmol/g.

(Resin Particle 5)

An aqueous dispersion of resin particle 5 having a solid content (resin particle) of 40.0% were prepared with a procedure similar to that of the resin particle 1 except that the amount of use of methacrylic acid was changed to 0.60 parts. The amount of the acid group of the resin particle 5 was 270 µmol/g.

<Preparation of Ink>

Components shown in middle levels of Table 2 were mixed, sufficiently stirred, and then subjected to pressure filtration with a cellulose acetate filter (manufactured by Advantech Co., Ltd.) having a pore size of 3.0 µm, thereby preparing each sample of the ink. A relative dielectric constant of a water-soluble organic solvent was shown in parentheses. A number added to polyethylene glycol is a number-average molecular weight. The "acetylenol E100" is a product name of a surfactant manufactured by Kawaken Fine Chemicals Co., Ltd. Lower level of Table 2 shows a content S (%) of a first water-soluble organic solvent (represented as a "first solvent") having a relative dielectric constant of 10.0 or more to 40.0 or less, a content A (%) of a polyhydric alcohol derivative and a value of S/A (times).

TABLE 2

Compositions and Properties of Ink

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion liquid number | 1 | 2 | 3 | 4 | 5 | 2 | 3 | 4 | 1 | 1 | 1 | 1 |
| Compound number | 1 | 1 | 1 | 1 | 1 | 1 | 1 | 1 | 1 | 1 | 1 | 1 |
| Resin particle number | 1 | 1 | 1 | 1 | 1 | 1 | 1 | 1 | 1 | 1 | 1 | 1 |
| Pigment dispersion liquid | 40.0 | 40.0 | 40.0 | 40.0 | 40.0 | 8.0 | 8.0 | 8.0 | 40.0 | 40.0 | 40.0 | 40.0 |
| Compound | 1.5 | 1.5 | 1.5 | 1.5 | 1.5 | 1.5 | 1.5 | 1.5 | 1.5 | 1.5 | 1.5 | 1.5 |
| Aqueous dispersion of resin particle | 20.0 | 20.0 | 20.0 | 20.0 | 20.0 | 25.0 | 25.0 | 25.0 | 20.0 | 20.0 | 20.0 | 20.0 |
| Glycerin (42.3) | 14.0 | 14.0 | 14.0 | 14.0 | 14.0 | 14.0 | 14.0 | 14.0 | 14.0 | 14.0 | 14.0 | 14.0 |
| Ethylene glycol (40.4) | | | | | | | | | | | | |
| 1-(2-hydroxyethyl)-2-pyrrolidone (37.6) | | | | | | | | | 6.0 | | | |
| Trimethylolpropane (33.7) | 6.0 | 6.0 | 6.0 | 6.0 | 6.0 | 6.0 | 6.0 | 6.0 | | | | |
| Triethanolamine (31.9) | | | | | | | | | | 6.0 | | |
| Diethylene glycol (31.7) | | | | | | | | | | | 6.0 | |
| 2-methyl-1,3-propanediol (28.3) | | | | | | | | | | | | 6.0 |
| 2-pyrrolidone (28.0) | | | | | | | | | | | | |
| 3-methyl-1,5-pentanediol (23.9) | | | | | | | | | | | | |
| Triethylene glycol (22.7) | | | | | | | | | | | | |
| Polyethylene glycol 200 (18.9) | | | | | | | | | | | | |
| 1,2-hexanediol (14.8) | | | | | | | | | | | | |
| Polyethylene glycol 600 (11.4) | | | | | | | | | | | | |
| Triethylene glycol monobutyl ether (9.8) | | | | | | | | | | | | |
| 1,6-hexanediol (7.1) | | | | | | | | | | | | |
| Polyethylene glycol 1000 (4.6) | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 |
| Ammonium benzoate | | | | | | | | | | | | |
| Ion-exchanged water | 18.3 | 18.3 | 18.3 | 18.3 | 18.3 | 45.3 | 45.3 | 45.3 | 18.3 | 18.3 | 18.3 | 18.3 |
| First solvent content S (%) | 6.0 | 6.0 | 6.0 | 6.0 | 6.0 | 6.0 | 6.0 | 6.0 | 6.0 | 6.0 | 6.0 | 6.0 |
| Polyhydric alcohol derivative content A (%) | 1.5 | 1.5 | 1.5 | 1.5 | 1.5 | 1.5 | 1.5 | 1.5 | 1.5 | 1.5 | 1.5 | 1.5 |
| S/A value (times) | 4.0 | 4.0 | 4.0 | 4.0 | 4.0 | 4.0 | 4.0 | 4.0 | 4.0 | 4.0 | 4.0 | 4.0 |

| | Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Pigment dispersion liquid number | 1 | 1 | 1 | 1 | 1 | 1 | 1 | 1 | 1 | 1 | 1 | 1 |
| Compound number | 1 | 1 | 1 | 1 | 1 | 1 | 1 | 1 | 1 | 1 | 1 | 1 |
| Resin particle number | 1 | 1 | 1 | 1 | 1 | 1 | 1 | 1 | 1 | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 |
| Compound | 1.5 | 1.5 | 1.5 | 1.5 | 1.5 | 1.5 | 1.5 | 1.5 | 1.5 | 1.5 | 1.5 | 1.5 |
| Aqueous dispersion of resin particle | 20.0 | 20.0 | 20.0 | 20.0 | 20.0 | 20.0 | 20.0 | 20.0 | 20.0 | 20.0 | 20.0 | 20.0 |
| Glycerin (42.3) | 14.0 | 14.0 | 14.0 | 14.0 | 14.0 | 14.0 | 14.0 | 14.0 | 14.0 | 14.0 | 14.0 | 14.0 |
| Ethylene glycol (40.4) | | | | | | | | | | | | |
| 1-(2-hydroxyethyl)-2-pyrrolidone (37.6) | | | | | | | | | | | | |
| Trimethylolpropane (33.7) | | | | | | | | 5.5 | 4.0 | 4.0 | 3.0 | 2.0 |
| Triethanolamine (31.9) | | | | | | | | 0.5 | | | | |
| Diethylene glycol (31.7) | | | | | | | | | | | | |
| 2-methyl-1,3-propanediol (28.3) | | | | | | | | | | | | |

TABLE 2-continued

Compositions and Properties of Ink

| | | | | | | | | | | | | |
|---|---|---|---|---|---|---|---|---|---|---|---|---|
| 2-pyrrolidone (28.0) | 6.0 | | | | | | | 2.0 | | | | |
| 3-methyl-1,5-pentanediol (23.9) | | 6.0 | | | | | | | | | | |
| Triethylene glycol (22.7) | | | 6.0 | | | | | | 2.0 | | | |
| Polyethylene glycol 200 (18.9) | | | | 6.0 | | | | | | | | |
| 1,2-hexanediol (14.8) | | | | | 6.0 | | | | | 2.0 | | 2.0 |
| Polyethylene glycol 600 (11.4) | | | | | | 6.0 | | | | | 3.0 | 2.0 |
| Triethylene glycol monobutyl ether (9.8) | | | | | | | | | | | | |
| 1,6-hexanediol (7.1) | | | | | | | | | | | | |
| Polyethylene glycol 1000 (4.6) | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 |
| Ammonium benzoate | | | | | | | | | | | | |
| Ion-exchanged water | 18.3 | 18.3 | 18.3 | 18.3 | 18.3 | 18.3 | 18.3 | 18.3 | 18.3 | 18.3 | 18.3 | 18.3 |
| First solvent content S (%) | 6.0 | 6.0 | 6.0 | 6.0 | 6.0 | 6.0 | 6.0 | 6.0 | 6.0 | 6.0 | 6.0 | 6.0 |
| Polyhydric alcohol derivative content A (%) | 1.5 | 1.5 | 1.5 | 1.5 | 1.5 | 1.5 | 1.5 | 1.5 | 1.5 | 1.5 | 1.5 | 1.5 |
| S/A value (times) | 4.0 | 4.0 | 4.0 | 4.0 | 4.0 | 4.0 | 4.0 | 4.0 | 4.0 | 4.0 | 4.0 | 4.0 |

| | Example | | | | | | | | | | | |
|---|---|---|---|---|---|---|---|---|---|---|---|---|
| | 25 | 26 | 27 | 28 | 29 | 30 | 31 | 32 | 33 | 34 | 35 | 36 |
| Pigment dispersion liquid number | 1 | 1 | 1 | 1 | 1 | 1 | 1 | 1 | 1 | 1 | 1 | 1 |
| Compound number | 1 | 1 | 1 | 1 | 1 | 1 | 2 | 3 | 4 | 5 | 6 | 7 |
| Resin particle number | 1 | 1 | 1 | 1 | 1 | 1 | 1 | 1 | 1 | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 |
| Compound | 1.5 | 1.5 | 1.5 | 1.5 | 1.5 | 1.5 | 1.5 | 1.5 | 1.5 | 1.5 | 1.5 | 1.5 |
| Aqueous dispersion of resin particle | 20.0 | 20.0 | 20.0 | 20.0 | 20.0 | 20.0 | 20.0 | 20.0 | 20.0 | 20.0 | 20.0 | 20.0 |
| Glycerin (42.3) | 14.0 | | 11.0 | 11.0 | 11.0 | 11.0 | 14.0 | 14.0 | 14.0 | 14.0 | 14.0 | 14.0 |
| Ethylene glycol (40.4) | | 14.0 | | | | | | | | | | |
| 1-(2-hydroxyethyl)-2-pyrrolidone (37.6) | | | | | | | | | | | | |
| Trimethylolpropane (33.7) | 2.5 | 6.0 | 6.0 | 6.0 | 6.0 | 2.5 | 6.0 | 6.0 | 6.0 | 6.0 | 6.0 | 6.0 |
| Triethanolamine (31.9) | 0.5 | | | | | 0.5 | | | | | | |
| Diethylene glycol (31.7) | | | | | | | | | | | | |
| 2-methyl-1,3-propanediol (28.3) | | | | | | | | | | | | |
| 2-pyrrolidone (28.0) | | | | | | | | | | | | |
| 3-methyl-1,5-pentanediol (23.9) | | | | | | | | | | | | |
| Triethylene glycol (22.7) | | | | | | | | | | | | |
| Polyethylene glycol 200 (18.9) | | | | | | | | | | | | |
| 1,2-hexanediol (14.8) | 1.5 | | | | 1.5 | | | | | | | |
| Polyethylene glycol 600 (11.4) | 1.5 | | | | 1.5 | | | | | | | |
| Triethylene glycol monobutyl ether (9.8) | | | 3.0 | | | | | | | | | |
| 1,6-hexanediol (7.1) | | | | 3.0 | | | | | | | | |
| Polyethylene glycol 1000 (4.6) | | | | | | 3.0 | 3.0 | | | | | |
| Acetylenol E100 | 0.2 | 0.2 | 0.2 | 0.2 | 0.2 | 0.2 | 0.2 | 0.2 | 0.2 | 0.2 | 0.2 | 0.2 |
| Ammonium benzoate | | | | | | | | | | | | |
| Ion-exchanged water | 18.3 | 18.3 | 18.3 | 18.3 | 18.3 | 18.3 | 18.3 | 18.3 | 18.3 | 18.3 | 18.3 | 18.3 |
| First solvent content S (%) | 6.0 | 6.0 | 6.0 | 6.0 | 6.0 | 6.0 | 6.0 | 6.0 | 6.0 | 6.0 | 6.0 | 6.0 |
| Polyhydric alcohol derivative content A (%) | 1.5 | 1.5 | 1.5 | 1.5 | 1.5 | 1.5 | 1.5 | 1.5 | 1.5 | 1.5 | 1.5 | 1.5 |
| S/A value (times) | 4.0 | 4.0 | 4.0 | 4.0 | 4.0 | 4.0 | 4.0 | 4.0 | 4.0 | 4.0 | 4.0 | 4.0 |

| | Example | | | | | | | | | | | |
|---|---|---|---|---|---|---|---|---|---|---|---|---|
| | 37 | 38 | 39 | 36 | 37 | 38 | 39 | 40 | 41 | 42 | 43 | 44 |
| Pigment dispersion liquid number | 1 | 1 | 1 | 1 | 1 | 1 | 1 | 1 | 1 | 1 | 1 | 1 |
| Compound number | 8 | 9 | 10 | 11 | 12 | 13 | 14 | 1 | 1 | 1 | 1 | 1 |
| Resin particle number | 1 | 1 | 1 | 1 | 1 | 1 | 1 | 1 | 1 | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 |
| Compound | 1.5 | 1.5 | 1.5 | 1.5 | 1.5 | 1.5 | 1.5 | 0.3 | 0.5 | 4.0 | 4.3 | 1.5 |
| Aqueous dispersion of resin particle | 20.0 | 20.0 | 20.0 | 20.0 | 20.0 | 20.0 | 20.0 | 20.0 | 20.0 | 20.0 | 20.0 | 20.0 |
| Glycerin (42.3) | 14.0 | 14.0 | 14.0 | 14.0 | 14.0 | 14.0 | 14.0 | 18.8 | 18.0 | 4.0 | 2.8 | 19.5 |
| Ethylene glycol (40.4) | | | | | | | | | | | | |
| 1-(2-hydroxyethyl)-2-pyrrolidone (37.6) | | | | | | | | | | | | |
| Trimethylolpropane (33.7) | 6.0 | 6.0 | 6.0 | 6.0 | 6.0 | 6.0 | 6.0 | 1.2 | 2.0 | 16.0 | 17.2 | 0.5 |
| Triethanolamine (31.9) | | | | | | | | | | | | |
| Diethylene glycol (31.7) | | | | | | | | | | | | |
| 2-methyl-1,3-propanediol (28.3) | | | | | | | | | | | | |
| 2-pyrrolidone (28.0) | | | | | | | | | | | | |
| 3-methyl-1,5-pentanediol (23.9) | | | | | | | | | | | | |
| Triethylene glycol (22.7) | | | | | | | | | | | | |
| Polyethylene glycol 200 (18.9) | | | | | | | | | | | | |
| 1,2-hexanediol (14.8) | | | | | | | | | | | | |
| Polyethylene glycol 600 (11.4) | | | | | | | | | | | | |
| Triethylene glycol monobutyl ether (9.8) | | | | | | | | | | | | |
| 1,6-hexanediol (7.1) | | | | | | | | | | | | |
| Polyethylene glycol 1000 (4.6) | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 |
| Ammonium benzoate | | | | | | | | | | | | |
| Ion-exchanged water | 18.3 | 18.3 | 18.3 | 18.3 | 18.3 | 18.3 | 18.3 | 19.5 | 19.3 | 15.8 | 15.5 | 18.3 |

TABLE 2-continued

| Compositions and Properties of Ink | | | | | | | | | | | | |
|---|---|---|---|---|---|---|---|---|---|---|---|---|
| First solvent content S (%) | 6.0 | 6.0 | 6.0 | 6.0 | 6.0 | 6.0 | 6.0 | 1.2 | 2.0 | 16.0 | 17.2 | 0.5 |
| Polyhydric alcohol derivative content A (%) | 1.5 | 1.5 | 1.5 | 1.5 | 1.5 | 1.5 | 1.5 | 0.3 | 0.5 | 4.0 | 4.3 | 1.5 |
| S/A value (times) | 4.0 | 4.0 | 4.0 | 4.0 | 4.0 | 4.0 | 4.0 | 4.0 | 4.0 | 4.0 | 4.0 | 0.3 |

| | Example | | | | | | | | | Comparative Example | | |
|---|---|---|---|---|---|---|---|---|---|---|---|---|
| | 45 | 46 | 47 | 48 | 49 | 50 | 51 | 52 | 53 | 1 | 2 | 3 |
| Pigment dispersion liquid number | 1 | 1 | 1 | 1 | 1 | 1 | 1 | 1 | 1 | 1 | 1 | 1 |
| Compound number | 1 | 1 | 1 | 1 | 1 | 1 | 1 | 1 | 13 | — | 15 | 16 |
| Resin particle number | 1 | 1 | 1 | — | 2 | 3 | 4 | 5 | — | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 |
| Compound | 1.5 | 1.5 | 1.5 | 1.5 | 1.5 | 1.5 | 1.5 | 1.5 | 1.5 | 0.0 | 1.5 | 1.5 |
| Aqueous dispersion of resin particle | 20.0 | 20.0 | 20.0 | 0.0 | 20.0 | 20.0 | 20.0 | 20.0 | 0.0 | 20.0 | 20.0 | 20.0 |
| Glycerin (42.3) | 19.3 | 5.0 | 4.7 | 14.0 | 14.0 | 14.0 | 14.0 | 14.0 | 19.5 | 14.0 | 14.0 | 14.0 |
| Ethylene glycol (40.4) | | | | | | | | | | | | |
| 1-(2-hydroxyethyl)-2-pyrrolidone (37.6) | | | | | | | | 0.5 | | | | |
| Trimethylolpropane (33.7) | 0.7 | 15.0 | 15.3 | 6.0 | 6.0 | 6.0 | 6.0 | 6.0 | | 6.0 | 6.0 | 6.0 |
| Triethanolamine (31.9) | | | | | | | | | | | | |
| Diethylene glycol (31.7) | | | | | | | | | | | | |
| 2-methyl-1,3-propanediol (28.3) | | | | | | | | | | | | |
| 2-pyrrolidone (28.0) | | | | | | | | | | | | |
| 3-methyl-1,5-pentanediol (23.9) | | | | | | | | | | | | |
| Triethylene glycol (22.7) | | | | | | | | | | | | |
| Polyethylene glycol 200 (18.9) | | | | | | | | | | | | |
| 1,2-hexanediol (14.8) | | | | | | | | | | | | |
| Polyethylene glycol 600 (11.4) | | | | | | | | | | | | |
| Triethylene glycol monobutyl ether (9.8) | | | | | | | | | | | | |
| 1,6-hexanediol (7.1) | | | | | | | | | | | | |
| Polyethylene glycol 1000 (4.6) | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 |
| Ammonium benzoate | | | | | | | | | | | | |
| Ion-exchanged water | 18.3 | 18.3 | 18.3 | 38.3 | 18.3 | 18.3 | 18.3 | 18.3 | 38.3 | 19.8 | 18.3 | 18.3 |
| First solvent content S (%) | 0.7 | 15.0 | 15.3 | 6.0 | 6.0 | 6.0 | 6.0 | 6.0 | 0.5 | 6.0 | 6.0 | 6.0 |
| Polyhydric alcohol derivative content A (%) | 1.5 | 1.5 | 1.5 | 1.5 | 1.5 | 1.5 | 1.5 | 1.5 | 1.5 | 0.0 | 1.5 | 1.5 |
| S/A value (times) | 0.5 | 10.0 | 10.2 | 4.0 | 4.0 | 4.0 | 4.0 | 4.0 | 0.3 | — | 4.0 | 4.0 |

| | Comparative Example | | | | | | | | | | Reference Example |
|---|---|---|---|---|---|---|---|---|---|---|---|
| | 4 | 5 | 6 | 7 | 8 | 9 | 10 | 11 | 12 | 13 | 1 |
| Pigment dispersion liquid number | 1 | 1 | 1 | 1 | 1 | 1 | 1 | 1 | 1 | 1 | 1 |
| Compound number | 17 | 18 | 1 | 1 | 1 | 1 | — | 19 | 20 | 21 | 17 |
| Resin particle number | 1 | 1 | 1 | 1 | 1 | 1 | 1 | 1 | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 |
| Compound | 1.5 | 1.5 | 1.5 | 1.5 | 1.5 | 1.5 | 0.0 | 1.5 | 1.5 | 1.5 | 1.0 |
| Aqueous dispersion of resin particle | 20.0 | 20.0 | 20.0 | 20.0 | 20.0 | 20.0 | 20.0 | 20.0 | 20.0 | 20.0 | 20.0 |
| Glycerin (42.3) | 14.0 | 14.0 | 14.0 | 14.0 | 14.0 | 14.0 | 14.0 | 14.0 | 14.0 | 14.0 | 7.0 |
| Ethylene glycol (40.4) | | | 6.0 | | | | | | | | |
| 1-(2-hydroxyethyl)-2-pyrrolidone (37.6) | | | | | | | | | | | |
| Trimethylolpropane (33.7) | 6.0 | 6.0 | | | | | 6.0 | 6.0 | 6.0 | 6.0 | |
| Triethanolamine (31.9) | | | | | | | | | | | |
| Diethylene glycol (31.7) | | | | | | | | | | | |
| 2-methyl-1,3-propanediol (28.3) | | | | | | | | | | | |
| 2-pyrrolidone (28.0) | | | | | | | | | | | |
| 3-methyl-1,5-pentanediol (23.9) | | | | | | | | | | | |
| Triethylene glycol (22.7) | | | | | | | | | | | |
| Polyethylene glycol 200 (18.9) | | | | | | | | | | | |
| 1,2-hexanediol (14.8) | | | | | | | | | | | |
| Polyethylene glycol 600 (11.4) | | | | | | | | | | | |
| Triethylene glycol monobutyl ether (9.8) | | | | 6.0 | | | | | | | |
| 1,6-hexanediol (7.1) | | | | | 6.0 | | | | | | |
| Polyethylene glycol 1000 (4.6) | | | | | | 6.0 | | | | | 3.0 |
| Acetylenol E100 | 0.2 | 0.2 | 0.2 | 0.2 | 0.2 | 0.2 | 0.2 | 0.2 | 0.2 | 0.2 | 0.2 |
| Ammonium benzoate | | | | | | | 1.0 | | | | |
| Ion-exchanged water | 18.3 | 18.3 | 18.3 | 18.3 | 18.3 | 18.3 | 18.8 | 18.3 | 18.3 | 18.3 | 28.8 |
| First solvent content S (%) | 6.0 | 6.0 | 0.0 | 0.0 | 0.0 | 0.0 | 6.0 | 6.0 | 6.0 | 6.0 | 0.0 |
| Polyhydric alcohol derivative content A (%) | 1.5 | 1.5 | 1.5 | 1.5 | 1.5 | 1.5 | 0.0 | 1.5 | 1.5 | 1.5 | 1.0 |
| S/A value (times) | 4.0 | 4.0 | 0.0 | 0.0 | 0.0 | 0.0 | — | 4.0 | 4.0 | 4.0 | 0.0 |

<Evaluation>

The following evaluation was conducted with an ink jet recording apparatus (product name "PIXUS PRO-10", manufactured by Canon Inc.) equipped with a recording head for ejecting an ink by thermal energy. It is defined that the ink jet recording apparatus has a recording duty of 100% for an image having a resolution of 600 dpi×600 dpi and recorded under conditions that eight droplets of 3.8 ng of the ink was applied to a unit area of 1/600 inch×1/600 inch. In the present invention, "A" and "B" are allowable levels and "C" is an unallowable level under evaluation criteria of items below. Table 3 shows evaluation results.

(Suppression of Feathering)

The ink cartridge was filled with the ink and set in the ink jet recording apparatus described above. On the recording medium (product name "GF-500," manufactured by Canon Inc.), a solid image (0.5 mm long×2 cm wide) having a recording duty of 100% was recorded. A raggedness value of an edge portion of the solid image was measured, and suppression of feathering was evaluated based on evaluation criteria below. The raggedness value was measured with a personal image quality evaluation system (product name "Personal IAS," manufactured by Quality Engineering Associates). As the raggedness value decreases, the edge becomes sharp, and the degree of suppression of feathering increases.

A: The raggedness value was 12 µm or less.
B: The raggedness value was more than 12 µm to 17 µm or less.
C: The raggedness value was more than 17 µm.

(Ejection Stability)

The ink cartridge was filled with the ink and set in the ink jet recording apparatus described above. On a recording medium (product name "GF-500," manufactured by Canon Inc.), 20 sheets of A4-sized solid images having a recording duty of 50% was recorded. Disturbance states of the first and twentieth sheets of the images were visually observed, and ejection stability was evaluated based on evaluation criteria as follows:

A: 20 sheets of images could be recorded, and a slight disturbance was observed in the twentieth sheet of the image.
B: 20 sheets of images could be recorded, and a conspicuous disturbance was observed in the twentieth sheet of the image, as compared to the first sheet of the image.
C: 20 sheets of images could not be recorded.

TABLE 3

| | | Evaluation Result | |
|---|---|---|---|
| | | Suppression of feathering | Ejection stability |
| Example | 1 | A | A |
| | 2 | A | A |
| | 3 | A | A |
| | 4 | A | A |
| | 5 | A | A |
| | 6 | A | A |
| | 7 | A | A |
| | 8 | A | A |
| | 9 | B | A |
| | 10 | B | A |
| | 11 | B | A |
| | 12 | B | A |
| | 13 | B | A |
| | 14 | B | A |
| | 15 | B | A |
| | 16 | B | A |
| | 17 | B | A |
| | 18 | A | A |
| | 19 | A | A |
| | 20 | A | A |
| | 21 | A | A |
| | 22 | A | A |
| | 23 | A | A |
| | 24 | A | A |
| | 25 | A | A |
| | 26 | A | A |
| | 27 | A | A |
| | 28 | A | A |
| | 29 | A | A |
| | 30 | A | A |
| | 31 | B | A |
| | 32 | B | A |
| | 33 | A | A |
| | 34 | A | A |
| | 35 | A | B |
| | 36 | B | A |
| | 37 | A | A |
| | 38 | A | A |
| | 39 | A | B |
| | 40 | B | A |
| | 41 | B | A |
| | 42 | B | A |
| | 43 | A | B |
| | 44 | B | A |
| | 45 | A | A |
| | 46 | A | A |
| | 47 | A | B |
| | 48 | A | B |
| | 49 | A | A |
| | 50 | A | A |
| | 51 | B | A |
| | 52 | B | A |
| | 53 | B | B |
| | 54 | A | A |
| | 55 | A | A |
| | 56 | A | B |
| | 57 | B | B |
| Comparative Example | 1 | C | A |
| | 2 | C | A |
| | 3 | C | A |
| | 4 | C | A |
| | 5 | A | C |
| | 6 | A | C |
| | 7 | A | C |
| | 8 | A | C |
| | 9 | A | C |
| | 10 | A | C |
| | 11 | A | C |
| | 12 | C | A |
| | 13 | A | C |
| Reference Example | 1 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133623, filed Jul. 7, 2017, and Japanese Patent Application No. 2018-098723, filed May 23, 2018, which are hereby incorporated by reference herein in their entirety.

What is claimed is:

1. An aqueous ink for ink jet, the aqueous ink comprising:
(i) a pigment;
(ii) a polyhydric alcohol derivative; and
(iii) a water-soluble organic solvent,
wherein the polyhydric alcohol derivative is a compound in which a proportion of $\{Y/(X+Y)\}\times 100(\%)$, where X mole(s) of ethylene oxide group(s) and Y mole(s) of propylene oxide group(s) are added to a polyhydric alcohol having three or more hydroxy groups, is 55% or more to 95% or less, and wherein the water-soluble organic solvent comprises a first water-soluble organic solvent having a relative dielectric constant of 10.0 or more to 40.0 or less.

2. The aqueous ink according to claim 1, wherein the proportion of {Y/(X+Y)}×100(%) is 70% or more to 90% or less.

3. The aqueous ink according to claim 1, wherein the polyhydric alcohol derivative has a molecular weight of 1,500 or more to 25,000 or less.

4. The aqueous ink according to claim 1, wherein the polyhydric alcohol comprises a sorbitol.

5. The aqueous ink according to claim 1, wherein a content (% by mass) of the polyhydric alcohol derivative is 0.5% by mass or more to 4.0% by mass or less with respect to a total mass of the ink.

6. The aqueous ink according to claim 1, wherein a content (% by mass) of the first water-soluble organic solvent is 0.5 times or more to 10.0 times or less as large as a content (% by mass) of the polyhydric alcohol derivative in terms of a mass ratio.

7. The aqueous ink according to claim 1, wherein the first water-soluble organic solvent is a compound that is solid at 25° C.

8. The aqueous ink according to claim 1, further comprising a resin particle.

9. The aqueous ink according to claim 8, wherein the resin particle has an acid group, and
wherein an introduction amount of the acid group of the resin particle is 120 μmol/g or more to 250 μmol/g or less.

10. An ink cartridge comprising an ink and an ink storage portion storing the ink, wherein the ink comprises the aqueous ink according to claim 1.

11. An ink jet recording method for recording an image on a recording medium by ejecting an ink from an ink jet recording head, wherein the ink comprises the aqueous ink according to claim 1.

12. The aqueous ink according to claim 1, wherein a content (% by mass) of the pigment is 0.5% by mass or more to 15.0% by mass or less with respect to a total mass of the ink.

13. The aqueous ink according to claim 1, wherein a content (% by mass) of the first water-soluble organic solvent is 0.5% by mass or more to 40.0% by mass or less with respect to a total mass of the ink.

14. The aqueous ink according to claim 1, wherein the first water-soluble organic solvent that is solid at 25° C. comprises at least one of trimethylolpropane and polyethylene glycol having a number-average molecular weight of 600.

* * * * *